US012596566B2

(12) United States Patent
Suh

(10) Patent No.: US 12,596,566 B2
(45) Date of Patent: Apr. 7, 2026

(54) OPERATING SYSTEM PERFORMANCE INTERFERENCE PREVENTING APPARATUS OF HYPERVISOR SYSTEM

(71) Applicant: PERSEUS CO., LTD, Siheung-si (KR)

(72) Inventor: Sang-Bum Suh, Seoul (KR)

(73) Assignee: PERSEUS CO., LTD, Siheung-si (KR)

( * ) Notice: Subject to any disclaimer, the term of this patent is extended or adjusted under 35 U.S.C. 154(b) by 616 days.

(21) Appl. No.: 18/005,739

(22) PCT Filed: Dec. 30, 2021

(86) PCT No.: PCT/KR2021/020262
§ 371 (c)(1),
(2) Date: Jan. 17, 2023

(87) PCT Pub. No.: WO2023/128013
PCT Pub. Date: Jul. 6, 2023

(65) Prior Publication Data
US 2023/0418652 A1    Dec. 28, 2023

(51) Int. Cl.
*G06F 9/455*        (2018.01)
(52) U.S. Cl.
CPC ..................... *G06F 9/45558* (2013.01); *G06F 2009/45579* (2013.01)
(58) Field of Classification Search
CPC ................... G06F 9/45558; G06F 2009/45579
See application file for complete search history.

(56) References Cited

U.S. PATENT DOCUMENTS

2010/0037232 A1*   2/2010   Lee ..................... G06F 9/45558
                                                              718/104
2011/0145814 A1*   6/2011   Mangione-Smith .........................
                                                              G06F 9/5077
                                                              718/1
(Continued)

FOREIGN PATENT DOCUMENTS

JP        2010-40043 A     2/2010
KR   10-2011-0066063 A     6/2011
(Continued)

OTHER PUBLICATIONS

Daniel Knight, "A history of Palm, Part 5: The end and the Post Mortem", lowendmac.com/2016/a-history-of-palm-part-5-the-end-and-the-post-mortem/, Jul. 25, 2016 (Year: 2016).*
(Continued)

*Primary Examiner* — Lewis A Bullock, Jr.
*Assistant Examiner* — Kevin X Lu
(74) *Attorney, Agent, or Firm* — Merchant & Gould P.C.

(57)        ABSTRACT

The present invention relates to an operating system performance interference preventing apparatus of a hypervisor system.
The present invention includes a hardware physical layer, an operating system layer composed of a plurality of operating systems of different types, and a hypervisor that allocates basic resources for using system resources of the hardware physical layer for each of a plurality of operating system domains corresponding to a plurality of operating systems constituting the operating system layer so that the plurality of operating systems operate in a virtual machine environment, and the basic resources allocated by the hypervisor for each of the plurality of operating system domains include a first resource consumed when a specific operating system domain, which is one of the plurality of operating system domains, directly uses the system resources, a second (Continued)

resource consumed when the hypervisor uses the system resources, and a third resource consumed in a process of using the system resources by a device driver domain that drives an input/output device of the hardware physical layer when the specific operating system domain uses the input/output device.

According to the present invention, there is an effect of solving the problem that a phenomenon, in which system resources allocated according to the original specifications for each operating system on the hypervisor become insufficient, occurs due to an occurrence of a situation, in which some operating system domains operating on the hypervisor excessively use system resources, and remaining operating system domains, particularly a real-time operating system, cannot operate while satisfying real-time requirements.

4 Claims, 6 Drawing Sheets

(56)  References Cited

U.S. PATENT DOCUMENTS

2016/0269440 A1*  9/2016  Hartman ................. H04L 51/42
2021/0157621 A1*  5/2021  Galles ..................... H04L 47/70

FOREIGN PATENT DOCUMENTS

| KR | 10-1435499 | B1 | 8/2014 | | |
| KR | 10-2015-0090439 | A | 8/2015 | | |
| KR | 10-2015-0132218 | A | 11/2015 | | |
| KR | 10-1696804 | B1 | 1/2017 | | |
| KR | 10-2019-0029977 | A | 3/2019 | | |
| KR | 10-2021-0127427 | A | 10/2021 | | |
| KR | 10-2021-0154769 | A | 12/2021 | | |
| WO | WO-2004112394 | A1 * | 12/2004 | ......... | H04N 21/4349 |

OTHER PUBLICATIONS

International Searching Authority/KR, International Search Report, Application No. PCT/KR2021/020262, dated Sep. 19, 2022, 3 pages (in Korean).

Japan Patent Office, Application No. 2023-504130, Office Action, dated Mar. 12, 2024, 6 pages.

* cited by examiner

[FIG. 1]
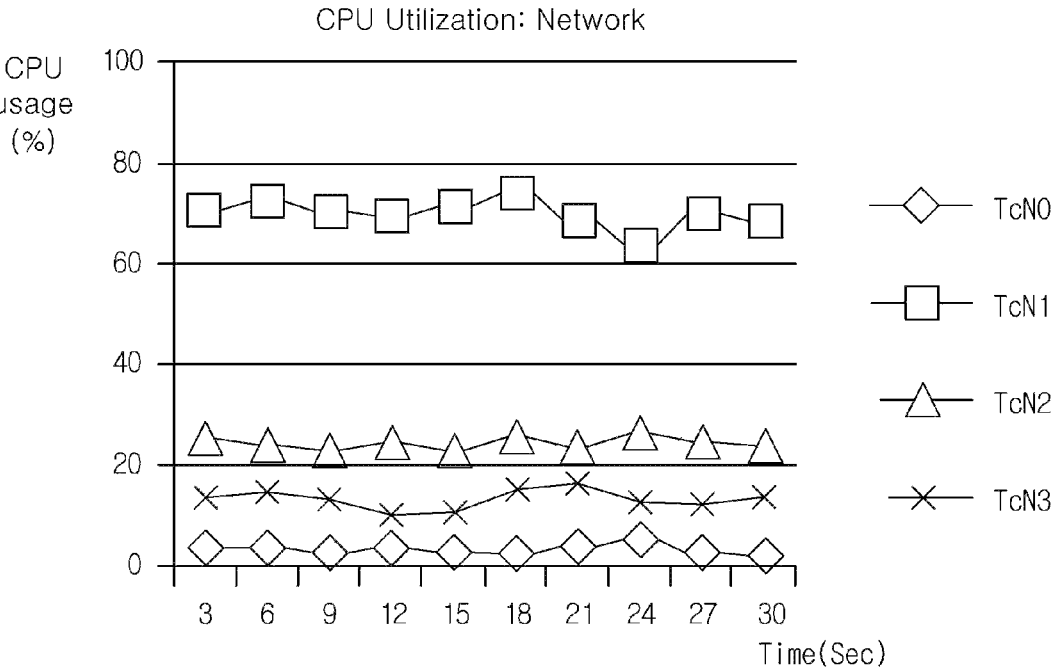

[FIG. 2]
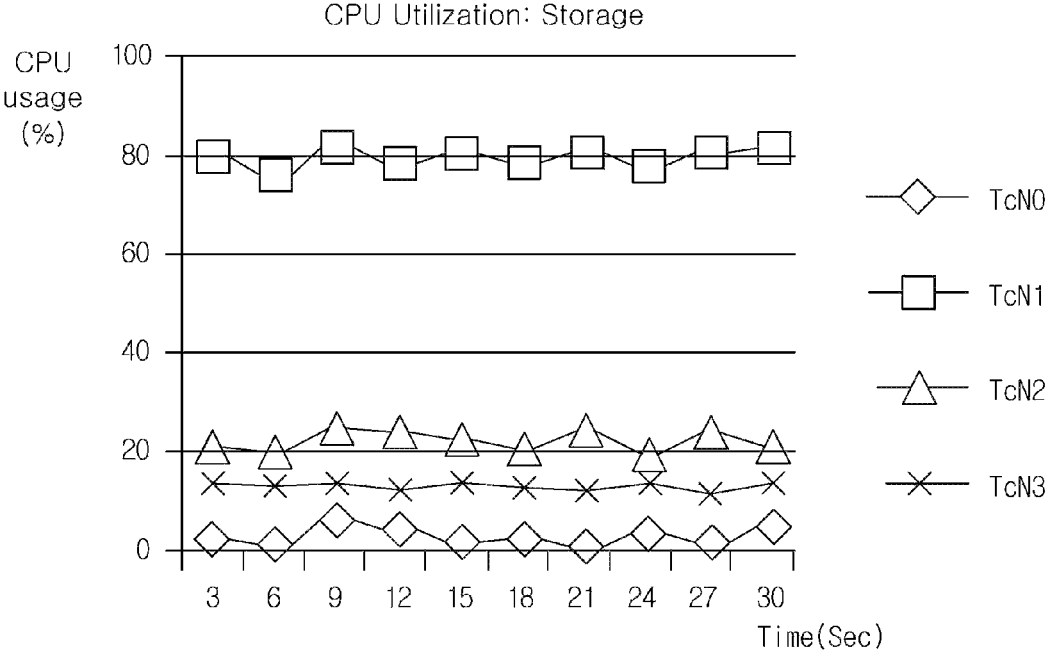

[FIG. 3]
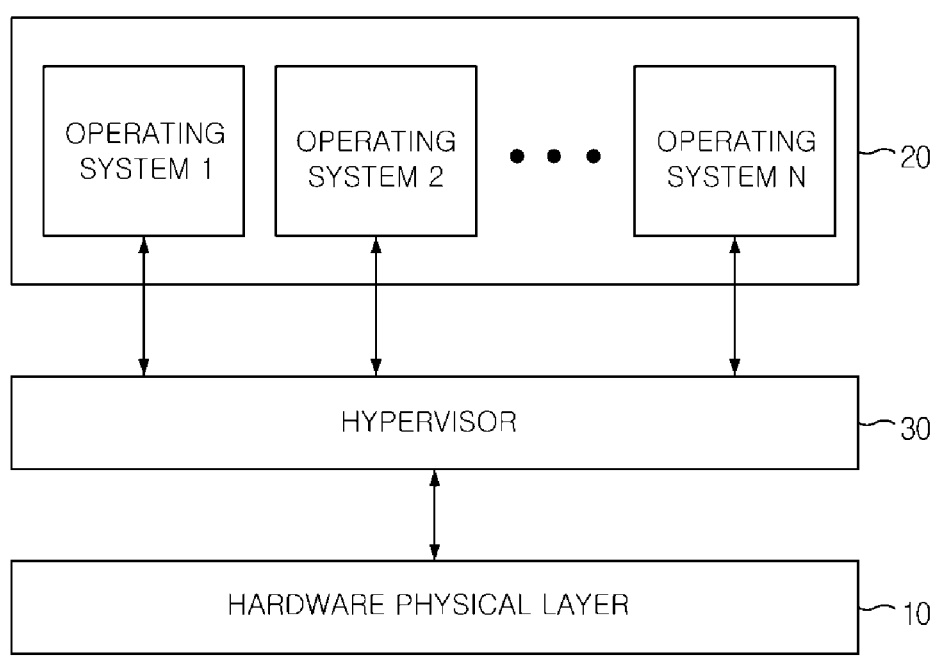

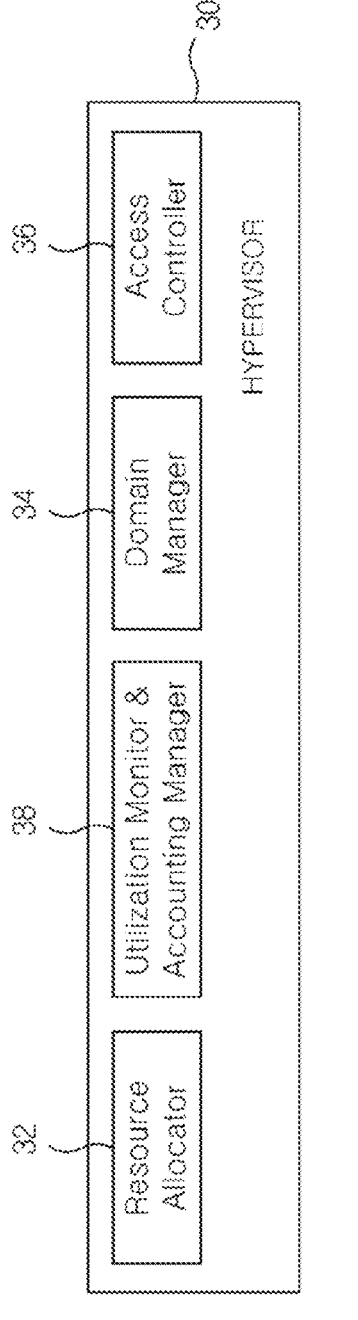
[FIG. 4]

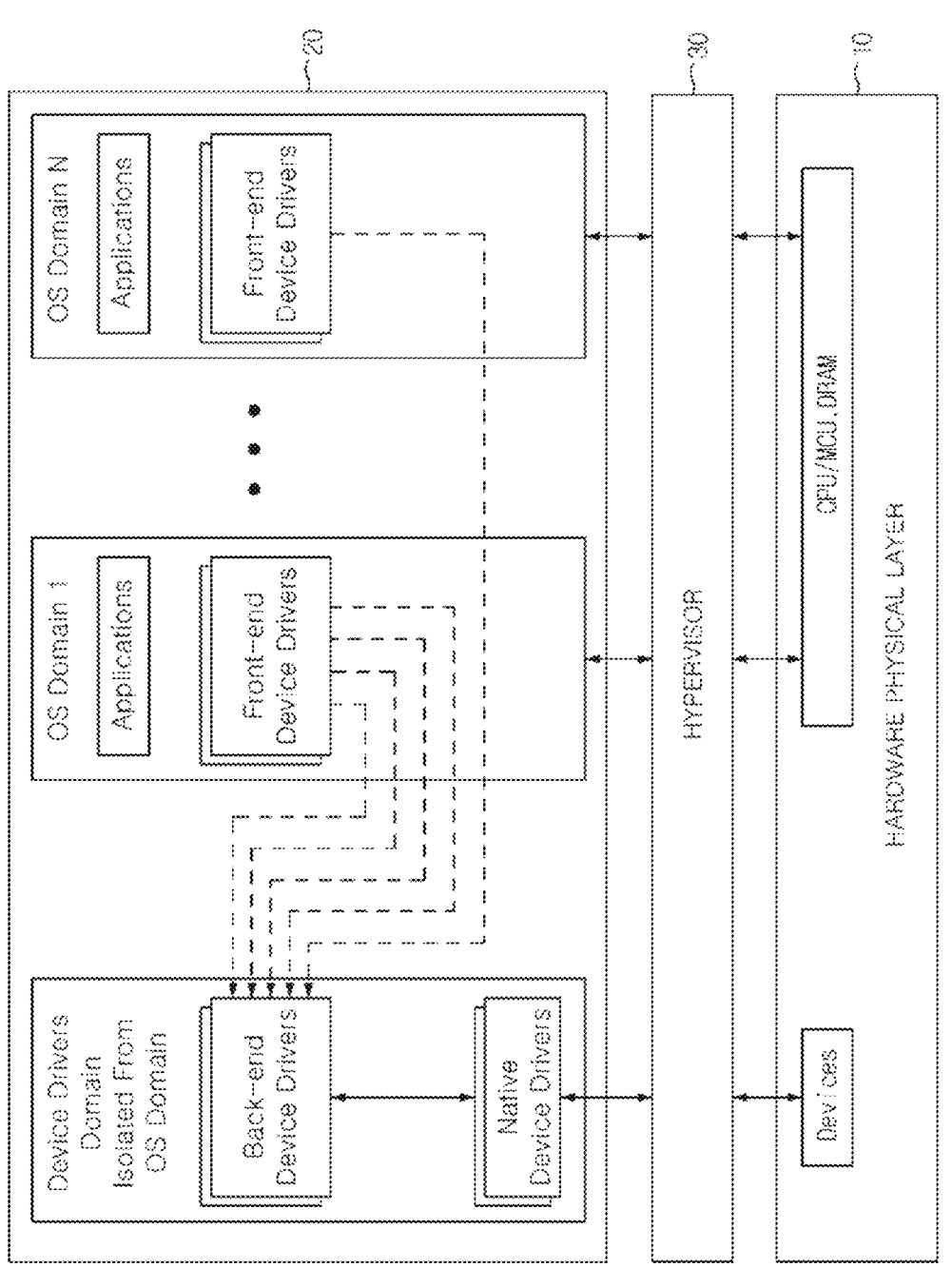
[FIG. 5]

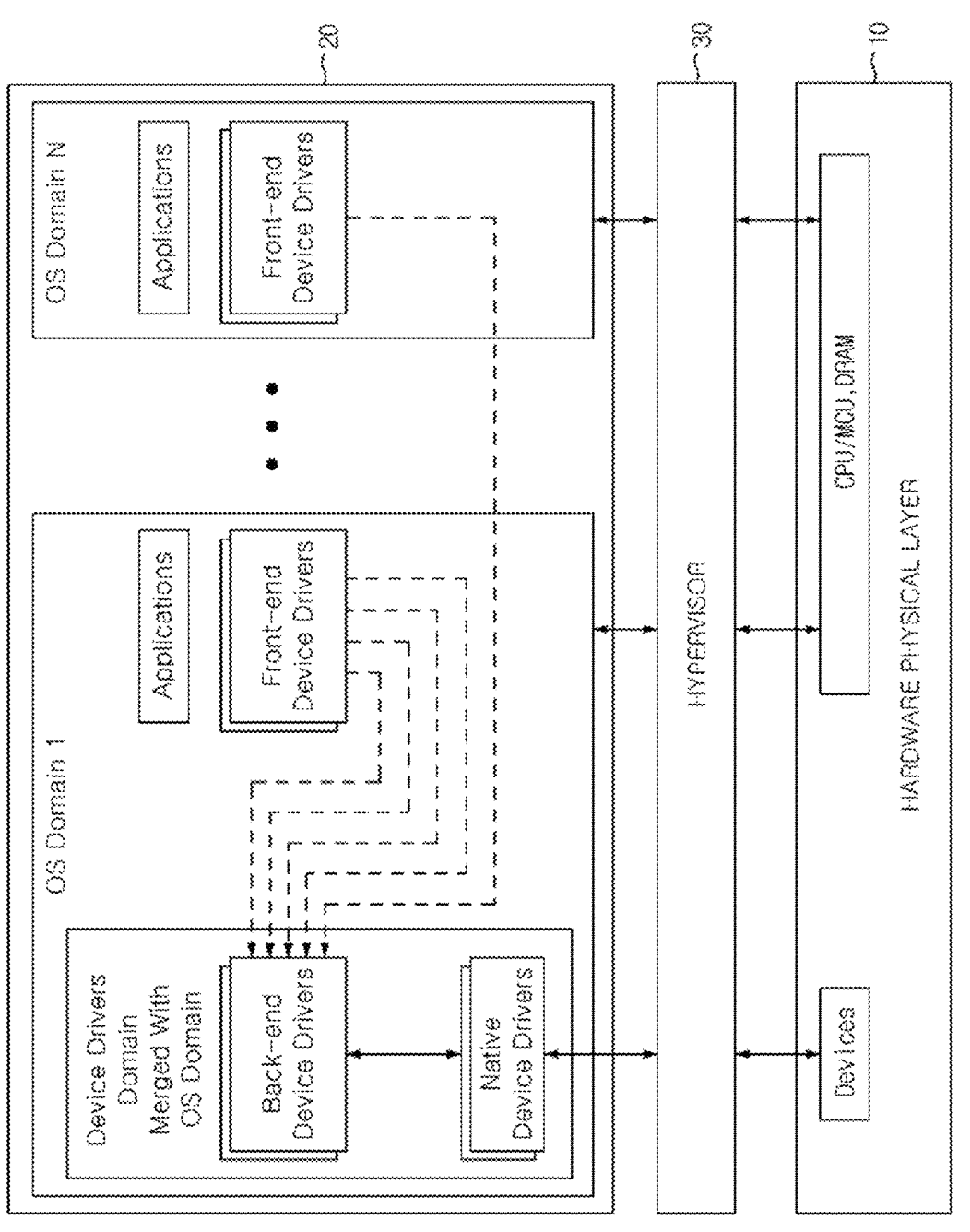
[FIG. 6]

OPERATING SYSTEM PERFORMANCE INTERFERENCE PREVENTING APPARATUS OF HYPERVISOR SYSTEM

This application is the national phase entry of international patent application no. PCT/KR2021/020262, filed Dec. 30, 2021, the disclosures of which are incorporated herein by reference in their entirety.

TECHNICAL FIELD

The present invention relates to an operating system performance interference preventing apparatus of a hypervisor system. More particularly, the present invention relates to an operating system performance interference preventing apparatus of a hypervisor system capable of preventing a problem that a phenomenon, in which system resources allocated according to original specifications for each operating system on a hypervisor become insufficient, occurs due to an occurrence of a situation, in which some operating system domains operating on the hypervisor excessively use system resources, and remaining operating system domains, particularly a real-time operating system, cannot operate while satisfying real-time requirements.

BACKGROUND ART

In general, hypervisor software is software that enables one computer hardware to turn into multiple pieces of virtual computer hardware, and, for the design/development of hypervisor software, a high level of technology at the level of creating general-purpose operating system software such as Windows and Linux is required.

In the past, hypervisors have been used to increase the efficiency of hardware of cloud data centers and to operate computing so that banking services are not interrupted even when an operating system is upgraded.

In the future, the hypervisor is predicted to expand its application to advanced devices such as future cars, drones, and robots. The operating system running on the existing hypervisor was a general-purpose operating system such as Linux, but the field to be used in the future is real-time systems such as automobiles, drones, and robots. Therefore, as for the operating system operating on the hypervisor, it is predicted that the real-time operating system will become the mainstream.

When such a hypervisor efficiently uses computer hardware and simultaneously operates several operating systems, the hypervisor allocates hardware resources for each operating system according to given specifications to operate the operating system.

Meanwhile, among hardware resources, input/output devices such as a network, a touch screen, and a mouse commonly used by multiple operating systems on the hypervisor may consume more resources than hardware resources allocated according to specifications.

Due to a situation in which hardware resources are excessively used, a phenomenon in which hardware resources allocated according to the original specifications for each operating system on the hypervisor become insufficient may occur.

Since an apparatus such as a car, drone, and robot that will be applied in the future use a real-time operating system, when the hardware resource shortage described above occurs, there is a problem that the real-time operating system cannot provide normal service, and the system such as the car, drone, and robot malfunctions.

This problem will be more specifically and exemplarily described with reference to FIGS. 1 and 2 as follows.

FIG. 1 is a diagram exemplarily illustrating CPU resources consumed by four different operating systems for a network function according to the prior art, and FIG. 2 is a diagram exemplarily illustrating CPU resources consumed by four different operating systems for a storage function according to the prior art.

Referring to FIGS. 1 and 2, an operating system TcN1 excessively consumes CPU resources for the network function and the storage function, which is an extreme phenomenon caused when the problem described above occurs. In this way, when a specific operating system excessively uses about 70% of hardware resources, the problem that other operating systems cannot sufficiently use the hardware resources allocated according to the specifications occurs.

DISCLOSURE OF THE INVENTION

Technical Problem

A technical problem of the present invention is to prevent a problem that a phenomenon, in which system resources allocated according to original specifications for each operating system on the hypervisor become insufficient, occurs due to an occurrence of a situation, in which some operating system domains operating on the hypervisor excessively use system resources, and remaining operating system domains, particularly real-time operating systems, cannot operate while satisfying real-time requirements.

A more specific technical problem of the present invention is to fundamentally prevent a problem that system resources for the operating system domains operating on the hypervisor becomes insufficient, by precisely measuring back-end device driver resource usage (f(CB)) that occurs when an operating system domain uses a back-end device driver of a device driver domain and native device driver resource usage (f(CN)) that occurs when the operating system domain uses a native device driver of the device driver domain and including them in fundamental resources allocated by the hypervisor to the operating system domains.

Technical Solution

An operating system performance interference preventing apparatus of a hypervisor system according to the present invention for solving these technical problems, includes a hardware physical layer, an operating system layer composed of a plurality of operating systems of different types, and a hypervisor that allocates basic resources for using system resources of the hardware physical layer for each of a plurality of operating system domains corresponding to a plurality of operating systems constituting the operating system layer so that the plurality of operating systems operate in a virtual machine environment, and the basic resources allocated by the hypervisor for each of the plurality of operating system domains include a first resource consumed when a specific operating system domain, which is one of the plurality of operating system domains, directly uses the system resources, a second resource consumed when the hypervisor uses the system resources, and a third resource consumed in a process of using the system resources by a device driver domain that drives an input/output device of the hardware physical layer when the specific operating system domain uses the input/output device.

In the operating system performance interference preventing apparatus of the hypervisor system according to the present invention, the third resource includes back-end device driver resource usage (f(CB)) that occurs when the specific operating system domain uses a back-end device driver of the device driver domain and native device driver resource usage (f(CN)) that occurs when the specific operating system domain uses a native device driver of the device driver domain.

In the operating system performance interference preventing apparatus of the hypervisor system according to the present invention, the first resource includes application resource usage (f(CA)) that occurs when an application of the specific operating system domain uses the system resources, front-end device driver resource usage (f(CF)) that occurs when a front-end device driver of the specific operating system domain uses the system resources, and basic resource usage (f(CO)) that occurs when the specific operating system domain uses the system resources regardless of the application and the front-end device driver.

In the operating system performance interference preventing apparatus of the hypervisor system according to the present invention, a utilization monitor and accounting manager constituting the hypervisor measures first unit system resource usage used for message exchange performed between the front-end device driver of the specific operating system domain and the back-end device driver of the device driver domain when an application of the specific operating system domain uses the input/output device, and calculates the back-end device driver resource usage (f(CB)) by multiplying the first unit system resource usage by the number of message exchanges, and measures a second unit system resource usage used by the device driver domain when messages are exchanged between the front-end device driver of the specific operating system domain and the back-end device driver of the device driver domain, and calculates the native device driver resource usage (f(CN)) by multiplying the second unit system resource usage by the number of message exchanges.

In the operating system performance interference preventing apparatus of the hypervisor system according to the present invention, the system resources include one or more of a central processing unit (CPU) resource, a microcontroller unit (MCU) resource, and a memory resource.

In the operating system performance interference preventing apparatus of the hypervisor system according to the present invention, the plurality of operating systems constituting the operating system layer include one or more real-time operating systems and one or more general-purpose operating systems.

Advantageous Effects

According to the present invention, there is an effect of solving the problem that a phenomenon, in which system resources allocated according to the original specifications for each operating system on the hypervisor become insufficient, occurs due to an occurrence of a situation, in which some operating system domains operating on the hypervisor excessively use system resources, and remaining operating system domains, particularly a real-time operating system, cannot operate while satisfying real-time requirements.

Further, there is an effect of fundamentally preventing the problem that system resources for the operating system domains operating on the hypervisor becomes insufficient, by precisely measuring back-end device driver resource usage (f(CB)) that occurs when the operating system domain uses the back-end device driver of the device driver domain and native device driver resource usage (f(CN)) that occurs when the operating system domain uses the native device driver of the device driver domain and including them in fundamental resources allocated by the hypervisor to the operating system domain.

BRIEF DESCRIPTION OF THE DRAWINGS

FIG. 1 is a diagram exemplarily illustrating CPU resources consumed by four different operating systems for a network function according to the prior art.

FIG. 2 is a diagram exemplarily illustrating the CPU resources consumed by four different operating systems for a storage function according to the prior art.

FIG. 3 is a diagram illustrating an operating system performance interference preventing apparatus of a hypervisor system according to an embodiment of the present invention.

FIG. 4 is a diagram exemplarily illustrating a configuration of a hypervisor according to an embodiment of the present invention.

FIGS. 5 and 6 are diagrams for illustratively describing specific operations of the operating system performance interference preventing apparatus of the hypervisor system according to an embodiment of the present invention.

MODE FOR CARRYING OUT THE INVENTION

Specific structural or functional descriptions of embodiments according to the concept of the present invention disclosed in this specification are only illustrated for the purpose of explaining the embodiments according to the concept of the present invention, and the embodiments according to the concept of the present invention may be embodied in various forms and are not limited to the embodiments described in this specification.

Various modifications may be made to the embodiments according to the concept of the present invention and the embodiments can have various forms, and thus the embodiments are illustrated in the drawings and described in detail in this specification. However, this is not intended to limit the embodiments according to the concept of the present invention to specific disclosure forms, and includes all modifications, equivalents, or substitutes included in the spirit and technical scope of the present invention.

Unless otherwise defined, all terms used herein, including technical or scientific terms, have the same meaning as commonly understood by one of ordinary skill in the art to which the present invention belongs. Terms such as those defined in commonly used dictionaries should be interpreted as having a meaning consistent with the meaning in the context of the related art, and should not be interpreted in an ideal or excessively formal meaning unless explicitly defined in the present application.

Hereinafter, a basic principle of the present invention will be described first, and then an embodiment of the present invention will be described in detail.

When a hypervisor 30 efficiently uses computer hardware to simultaneously operate a plurality of operating systems, the hypervisor 30 allocates hardware resources for each operating system according to given specifications to operate the operating system.

Among hardware resources, input/output devices such as a network, a touch screen, and a mouse commonly used by a plurality of operating systems on the hypervisor 30 may consume more resources than hardware resources allocated according to specifications.

Due to a situation in which hardware resources are excessively used, a phenomenon in which hardware resources allocated according to original specifications for each operating system on the hypervisor 30 becomes insufficient may occur.

That is, when a specific operating system among the plurality of operating systems excessively uses hardware resources, a problem that other operating systems except for the specific operating system cannot sufficiently use the hardware resources allocated according to specifications occurs.

Meanwhile, since an apparatus such as a car, drone, and robot that will be applied in the future use a real-time operating system, when the hardware resource shortage described above occurs, there is a problem that the real-time operating system cannot provide normal service and a system of the car, drone, robot, etc. malfunction.

The cause of such a hardware resource shortage phenomenon and its solution are described as follows.

In the prior art, when allocating resources to a plurality of operating systems operating on the hypervisor 30, hardware resources for an operating system kernel were allocated without considering resource usage by accurately classifying even "the input/output devices commonly used" by two or more operating systems, which resulted in a phenomenon of hardware resource shortage.

That is, according to the prior art, when one of the plurality of operating systems runs the service that uses the common input/output device a lot and another operating system runs a service that rarely uses the common input/output device, hardware resources used by the "commonly used input/output device" was not measured by being included in the resource usage. In addition, there is a problem in that when a virus infection, a bug, etc. occur in software, the problem expands even more.

The present invention solves these problems in the following way.

That is, in response to the proliferation of autonomous driving devices such as a future car, drone, and robot, it is necessary for the future hypervisor 30 to support the real-time operating system, and thus, it is necessary to sufficiently use hardware resources allocated according to predetermined specifications for each of the plurality of operating systems on the hypervisor 30.

To this end, the present invention provides a mechanism for managing hardware usage used by the "commonly used input/output device" driver in real time to ensure that these resource allocation amount are observed, while allowing the hypervisor 30 to integrate and allocate sufficient hardware resources for an application/kernel and an input/output device driver to use through, for example, regression analysis when allocating hardware resources for each operating system.

Hereinafter, a preferred embodiment of the present invention will be described in detail with reference to the accompanying drawings.

FIG. 3 is a diagram exemplarily illustrating an operating system performance interference preventing apparatus of a hypervisor system according to an embodiment of the present invention, and FIG. 4 is a diagram exemplarily illustrating a configuration of a hypervisor according to an embodiment of the present invention.

Referring to FIGS. 3 and 4, the operating system performance interference preventing apparatus of the hypervisor system according to an embodiment of the present invention may be configured to include a hardware physical layer 10, an operating system layer 20, and a hypervisor 30.

The hardware physical layer 10 is an element constituting a physical apparatus in which the operating system performance interference preventing apparatus of the hypervisor system according to an embodiment of the present invention is implemented. For example, the physical device constituting the hardware physical layer 10 may include a central processing unit (CPU) or a microcontroller unit (MCU), a memory including a dynamic random access memory (DRAM), etc., and an input/output device. The input/output device may include, but is not limited to, a storage, a network device, an information output device including a touch screen, etc., an information input device including a keyboard, a mouse, etc., a serial-in/out device, etc.

The operating system layer 20 is composed of a plurality of operating systems of different types. For example, the plurality of operating systems constituting the operating system layer 20 may be configured to include one or more real-time operating systems and one or more general-purpose operating systems including Unix, Windows, etc.

The hypervisor 30 is a component that allows a plurality of operating systems to operate in a virtual machine environment by allocating basic resources for using system resources of the hardware physical layer 10 for each of the plurality of operating system domains corresponding to the plurality of operating systems constituting the operating system layer 20.

For example, the system resources allocated by the hypervisor 30 for each of the plurality of operating system domains may include one or more of a central processing unit (CPU) resource, a microcontroller unit (MCU) resource, and a memory resource.

Referring to the example of FIG. 4, the hypervisor 30 may be configured to include a resource allocator 32, a domain manager 34, an access controller 36, and a utilization monitor and accounting manager 38.

The resource allocator 32 allocates an amount of system hardware resources such as the CPU and memory for each domain.

The domain manager 34 schedules domains in a time-division manner according to the amount of resources allocated by the resource allocator 32, and manages context switching during scheduling.

The access controller 36 controls access between objects such as domains, hardware system resources, and data.

The utilization monitor and accounting manager 38 monitors the amount of hardware system (e.g., including CPU) resources used by each domain, device driver and message, and manages usage.

For example, if the hardware system resource is the CPU resource, in an embodiment of the present invention, CPU usage quantitatively allocated for each operating system by adding the amount of CPU resources used by each operating system domain with the amount of CPU resources used by the device driver domain is accurately observed and managed using the utilization monitor and accounting manager 38 constituting the hypervisor 30. As a result, when the real-time operating system domain operates on the hypervisor 30, it is guaranteed to use CPU resources as allocated according to specifications, and thus the service of the real-time operating system can be stably guaranteed.

For example, the basic resources allocated by the hypervisor 30 for each of the plurality of operating system domains may be configured to include a first resource, a second resource, and a third resource.

The first resource is a resource consumed when a specific operating system domain, which is one of the plurality of operating system domains, directly uses the system resources.

For example, the first resource may be configured to include application resource usage (f(CA)), front-end device driver resource usage (f(CF)), and basic resource usage (f(CO)).

The application resource usage (f(CA)) is resource usage that occurs when an application of the specific operating system domain uses the system resources.

The front-end device driver resource usage (f(CF)) is resource usage that occurs when the front-end device driver of the specific operating system domain uses the system resources.

The basic resource usage (f(CO)) is resource usage that occurs when the specific operating system domain uses the system resources regardless of the application and the front-end device driver.

The second resource is a resource consumed when the hypervisor 30 uses the system resources.

The third resource is a resource consumed in a process of using system resources by the device driver domain that drives the input/output device when the specific operating system domain uses the input/output device of the hardware physical layer 10.

For example, the third resource may be configured to include back-end device driver resource usage (f(CB)) and native device driver resource usage (f(CN)).

The back-end device driver resource usage (f(CB)) is system resource usage that occurs when the specific operating system domain uses the back-end device driver of the device driver domain.

The native device driver resource usage (f(CN)) is system resource usage that occurs when the specific operating system domain uses the native device driver of the device driver domain.

For example, the utilization monitor and accounting manager 38 constituting the hypervisor 30 may be configured to measure first unit system resource usage used for message exchange performed between the front-end device driver of the specific operating system domain and the back-end device driver of the device driver domain when an application of the specific operating system domain uses the input/output device, and calculate the back-end device driver resource usage (f(CB)) by multiplying the first unit system resource usage by the number of message exchanges.

Further, for example, the hypervisor 30 may be configured to measure a second unit system resource usage used by the device driver domain when messages are exchanged between the front-end device driver of the specific operating system domain and the back-end device driver of the device driver domain and calculate the native device driver resource usage (f(CN)) by multiplying the second unit system resource usage by the number of message exchanges.

Hereinafter, with further referring to FIGS. 5 and 6, a specific operation of the operating system performance interference preventing apparatus of the hypervisor system according to an embodiment of the present invention will be illustratively described.

FIG. 5 is an example of a system architecture in which the device driver domain is isolated from an operating system domain, and FIG. 6 is an example of a system architecture in which the device driver domain is merged into the operating system domain. An embodiment of the present invention may be commonly applied to the system architecture illustrated in FIGS. 5 and 6. In the example with reference to FIGS. 5 and 6, the present embodiment is described based on the CPU resource among system resources, but substantially the same principle may be applied to memory resource such as DRAM.

Referring further to FIGS. 5 and 6, the hypervisor 30 performs a function of allocating the CPU (or MCU) resource and the DRAM resource for each of N operating system (OS) domains.

In this case, in the prior art, since only the CPU usage directly used by the operating system domain is managed when managing the CPU usage for each operating system domain allocated by the hypervisor 30, the CPU usage used by the device driver domain for each operating system domain is not reflected in the CPU usage of the corresponding operating system domain. As a result, the total sum of the CPU usage for the operating system domains and the CPU usage used by the device driver domain may exceed total CPU usage that the CPU can provide. Due to an inaccuracy of this allocation method, there is a problem that operating system domains using incorrectly allocated CPUs cannot operate while satisfying real-time requirements, especially in the case of a real-time operating system.

CPU usage used by software in the entire system can be expressed as Table 1 below. CPU usage is illustrated based on the K-th operating system domain among the N operating system domains in Table 1, but this example can be equally applied to other operating system domains.

TABLE 1

| Classification (Unit: MHz) | Description |
|---|---|
| $f(CA)_k$ | CPU usage used by application in K-th operating system domain |
| $f(CF)_k$ | CPU usage used by front-end device driver of K-th operating system domain |
| $f(CO)_k$ | CPU usage that K-th operating system domain uses by default regardless of application and front-end device driver |
| $f(CH)$ | CPU usage used by hypervisor |
| $f(CB)_k$ | CPU usage that occurs when K-th operating system domain uses back-end device driver of device driver domain |
| $f(CN)_k$ | CPU usage that occurs when K-th operating system domain uses native device driver of device driver domain |
| FC | Total amount according to CPU performance of system specification |

Referring to Table 1, the total CPU resource (F(CE)) that the hypervisor 30 can actually allocate to N operating system domains is as shown in Equation 1 below.

$$F(CE) = FC - f(CH) \qquad \text{[Equation 1]}$$

Problems that occur when the total CPU resource (F(CE)) of a hypervisor system according to the prior art is allocated for each operating system domain are as follows.

In the prior art, only $f(CA)_k$, $f(CF)_k$, $f(CO)_k$, and $f(CH)$ were mainly considered, and CPU resources were allocated for each operating system domain.

Here, in the prior art, when the K-th operating system domain uses the device driver domain according to the requirements of the application, how much CPU resources the device driver domain should use is not considered in advance. As a result, if the amount of CPU resources used by the device driver domain increases excessively, an abnormal CPU resource demand that exceeds the FC occurs during the entire system operation, which eventually makes it impossible for any operating system domain to use the amount of CPU resources allocated according to specifications. Thus, when the operating system domain is the real-time operating system, a problem that real-time service cannot be guaranteed occurs.

An embodiment of the present invention solves these problems of the prior art through the following configuration.

That is, in an embodiment of the present invention, a third resource consumed in a process of using the system resources by the device driver domain that drives the input/output device when any particular operating system domain among the plurality of operating system domains uses the input/output device of the hardware physical layer 10 is included in the basic resources allocated by the hypervisor for each of the plurality of operating system domains, and the third resource is configured to include the back-end device driver resource usage (f(CB)) that occurs when the specific operating system domain uses the back-end device driver of the device driver domain and the native device driver resource usage (f(CN)) that occurs when the specific operating system domain uses the native device driver of the device driver domain.

An exemplary configuration for estimating CPU usage such as f(CB) and f(CN) when using the device driver domain for each operating system domain is as follows.

For example, when an application of the K-th operating system domain is operating, in order to quantify f(CB) and f(CN) of the required device driver domain, if unit CPU usage for message exchange (see dotted lines in FIGS. 5 and 6) that occurs for the application to communicate with the back-end device driver of the device driver domain is measured and CPU usage used by the device driver domain used at that time is measured, the CPU usage of the K-th operating system domain, which is used when the back-end device driver and the native device driver are operated, can be obtained. To this end, for example, a configuration in which the CPU usage for each hardware is measured using measuring equipment such as an oscilloscope in advance and is stored may be adopted.

As described in detail above, according to the present invention, there is an effect of preventing the problem that a phenomenon, in which system resources allocated according to the original specifications for each operating system on the hypervisor become insufficient, occurs due to an occurrence of a situation, in which some operating system domains operating on the hypervisor excessively use system resources, and remaining operating system domains, particularly real-time operating systems, cannot operate while satisfying real-time requirements.

Further, there is an effect of fundamentally preventing the problem that system resources for the operating system domains operating on the hypervisor becomes insufficient, by precisely measuring back-end device driver resource usage (f(CB)) that occurs when the operating system domain uses the back-end device driver of the device driver domain and native device driver resource usage (f(CN)) that occurs when the operating system domain uses the native device driver of the device driver domain and including them in fundamental resources allocated by the hypervisor to the operating system domain.

DESCRIPTION OF REFERENCE SIGNS OF DRAWINGS

10: Hardware Physical Layer
20: Operating System Layer
30: Hypervisor
32: Resource Allocator

34: Domain Manager
36: Access Controller
38: Utilization Monitor & Accounting Manager

What is claimed is:

1. An operating system performance interference preventing apparatus of a hypervisor system, the apparatus comprising:
   a hardware physical layer;
   an operating system layer composed of a plurality of operating systems of different types; and
   a hypervisor that allocates basic resources for using system resources of the hardware physical layer for each of a plurality of operating system domains corresponding to a plurality of operating systems constituting the operating system layer so that the plurality of operating systems operate in a virtual machine environment,
   wherein the basic resources allocated by the hypervisor for each of the plurality of operating system domains include:
   a first resource consumed when a specific operating system domain, which is one of the plurality of operating system domains, directly uses the system resources;
   a second resource consumed when the hypervisor uses the system resources; and
   a third resource consumed in a process of using the system resources by a device driver domain that drives an input/output device of the hardware physical layer when the specific operating system domain uses the input/output device,
   wherein the third resource includes:
   back-end device driver resource usage (f(CB)) that occurs when the specific operating system domain uses a back-end device driver of the device driver domain; and
   native device driver resource usage (f(CN)) that occurs when the specific operating system domain uses a native device driver of the device driver domain,
   wherein a utilization monitor and accounting manager constituting the hypervisor measures first unit system resource usage used for message exchange performed between the front-end device driver of the specific operating system domain and the back-end device driver of the device driver domain when an application of the specific operating system domain uses the input/output device, and calculates the back-end device driver resource usage (f(CB)) by multiplying the first unit system resource usage by the number of message exchanges, and measures a second unit system resource usage used by the device driver domain when messages are exchanged between the front-end device driver of the specific operating system domain and the back-end device driver of the device driver domain, and calculates the native device driver resource usage (f(CN)) by multiplying the second unit system resource usage by the number of message exchanges.

2. The apparatus of claim 1, wherein the first resource includes:
   application resource usage (f(CA)) that occurs when an application of the specific operating system domain uses the system resources;
   front-end device driver resource usage (f(CF)) that occurs when a front-end device driver of the specific operating system domain uses the system resources; and basic resource usage (f(CO)) that occurs when the specific operating system domain uses the system resources regardless of the application and the front-end device driver.

3. The apparatus of claim 1, wherein the system resources include one or more of a central processing unit (CPU) resource, a microcontroller unit (MCU) resource, and a memory resource.

4. The apparatus of claim 1, wherein the plurality of operating systems constituting the operating system layer include one or more real-time operating systems and one or more general-purpose operating systems.

\*   \*   \*   \*   \*